E. RUUD.
AUTOMATIC TEMPERATURE CONTROL FOR SELF HEATING FLAT IRONS.
APPLICATION FILED SEPT. 7, 1912.

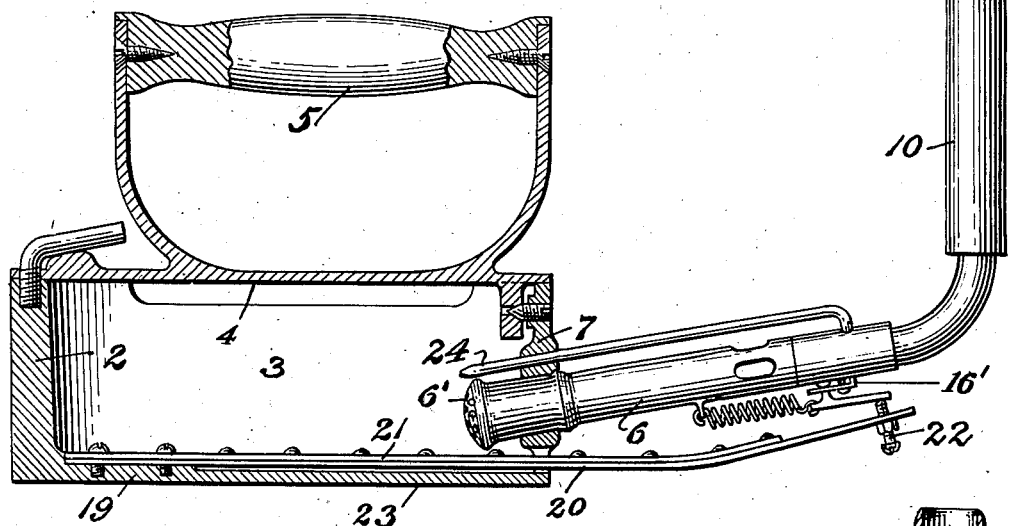

UNITED STATES PATENT OFFICE.

EDWIN RUUD, OF PITTSBURGH, PENNSYLVANIA.

AUTOMATIC TEMPERATURE CONTROL FOR SELF-HEATING FLAT-IRONS.

1,074,467. Specification of Letters Patent. Patented Sept. 30, 1913.

Application filed September 7, 1912. Serial No. 719,115.

*To all whom it may concern:*

Be it known that I, EDWIN RUUD, a citizen of the United States, and a resident of Pittsburgh, in the county of Allegheny and State of Pennsylvania, have invented certain new and useful Improvements in Automatic Temperature Control for Self-Heating Flat-Irons, of which the following is a specification.

The object of this invention is to provide simple and efficient means for automatically controlling the temperature of flat irons, the controlling means being actuated by variations in temperature of the smoothing face and maintaining the latter at approximately uniform temperature regardless of the work in hand. Overheating of the iron and scorching of materials is prevented, while on the other hand the heating means is made more active under the cooling tendency of heavy or excessively damp fabrics.

The invention is embodied in a heat controlling device that is actuated by a thermostat so located on the iron as to be affected by variations in temperature of the smoothing face, in the adaptation here shown gas heating means being employed with the thermostat operatively connected to the gas supply valve.

Figure 4:
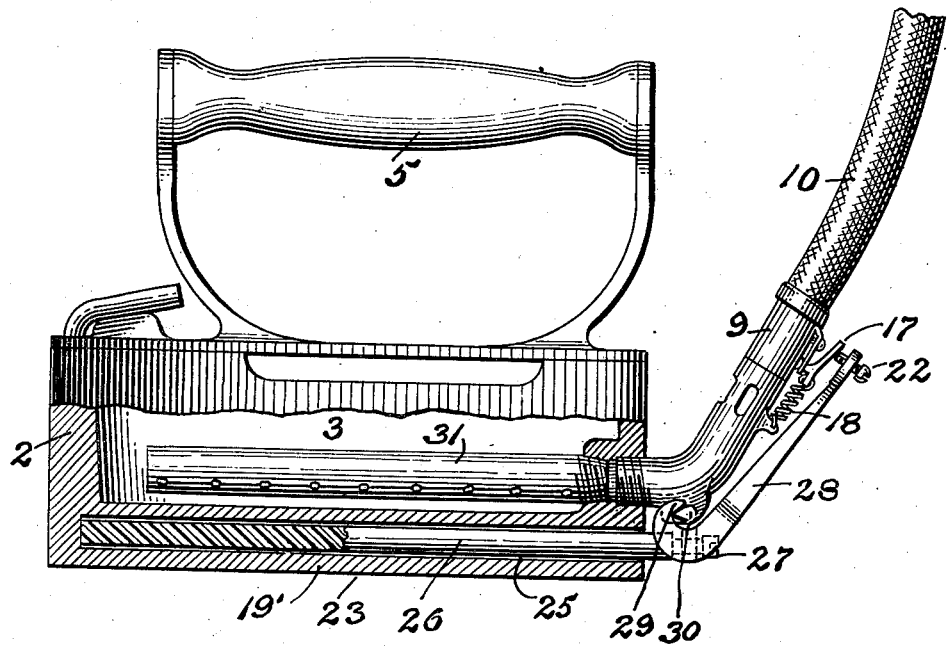

In the accompanying drawings, Figure 1 is a longitudinal section of a flat iron illustrating one adaptation of the invention, and Fig. 2 is a longitudinal section on a larger scale of the burner and the controlling means. Fig. 3 is a sectional elevation on line 3—3 of Fig. 2. Fig. 4 is a view partly in elevation and partly in longitudinal section of another form of thermostatic control, and Fig. 5 is a bottom plan of the same.

Referring to the adaptation of Figs. 1 and 2, the iron body 2 is recessed downwardly to form heating chamber 3 which is provided with removable cover 4 carrying handle 5, all of usual and well known construction for which no novelty is claimed. When gas burning means is utilized for heating the iron a mixing tube 6 carrying burner 6' is entered through and secured in the rear wall 7 of chamber 3, being formed with air inlet openings 8. A fitting 9 connecting with the outer end of tube 6 is adapted to receive a gas supply pipe 10. The interior of fitting 9 is in the form of a cylindrical chamber 11 having port 12 discharging into tube 6, and with a needle valve 13 for the port secured to piston 14 movable in chamber 11. The valve may be operated by a lever-arm 15 secured in pivot ball 16, the latter held in place by stop 16'. At the outer end of lever 15 is laterally extending arm 17 which is actuated by the thermostat to move the valve toward closed position, such movement being opposed and the valve held normally open by spring 18. Secured to bottom wall 19 of heating chamber 3 is the thermostatic element which may consist of two united strips of metal 20 and 21 having different coefficients of expansion, strip 20, for instance, being copper and strip 21 iron or steel. The thermostat extends through the rear wall of the iron and is curved upward slightly and carries screw 22 for adjustably engaging arm 17 of lever 15. With the thermostat secured to bottom wall 9 it is relatively close to the smoothing face 23 of the iron and although under the direct influence of the burner heat it is sensitive to variations in temperature of the smoothing face. The unequal expansion of the thermostat elements when the temperature rises tends to increase its curvature due to the greater expansion of element 20, thereby moving the gas controlling valve toward closed position. But such movement is obviously controlled by the temperature of bottom wall 19 so that the closing movement cannot be pronounced until the smoothing face reaches the desired maximum temperature. The movement may be controlled to a nicety by screw 22. While the adjustment may be such that sufficient gas always passes valve 12 to maintain a flame at the burner, a pilot burner 24 may be provided which connects with fitting 9 back of valve 14 so that if the valve is fully closed the burner is lighted when the valve is again opened.

Figure 5:
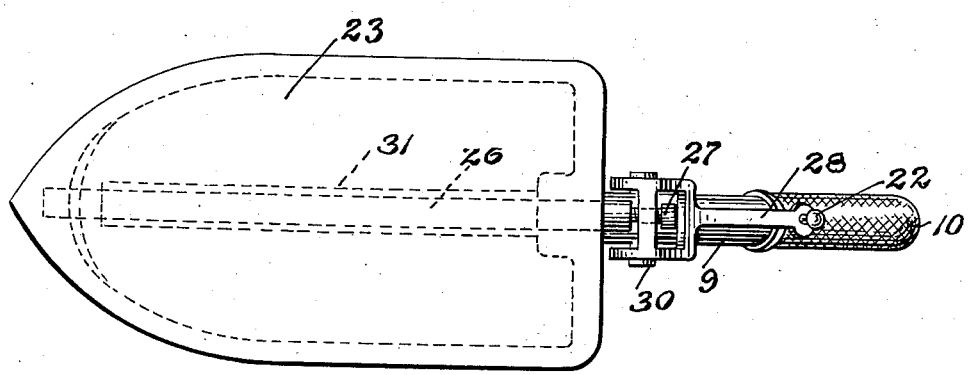

In the adaptation of Figs. 4 and 5, bottom wall 19' of heating chamber 3 is somewhat thicker and is formed with a longitudinal chamber 25 open through the rear end of the iron in which is located thermostatic rod 26 of copper or other metal having a different coefficient of expansion from the iron body, and the outer end of this rod is adjustably connected by screw 27 to lever 28, the latter having hook-like bearings 29 to engage trunnions 30. Lever 28 coöperates with arm 17 of the valve actuating lever the same as in the first described construction. Also in the adaptation of Fig. 4 perforated tubular burner 31 is located within chamber 3, being an alternative arrangement for the burner 6' of Fig. 1. The thermostatic control herein proposed is in close proximity to the smoothing-face of the iron and is sensitive to its temperature variations, providing substantially uniform heat for all kinds of fabrics, the cooler the smoothing surface the greater the amount of fuel passed to the burner, so that if the material is heavy or excessively damp, more heat is generated than when thinner or drier materials are being ironed. With screw 22 properly adjusted the operator may proceed with the ironing of various kinds of articles, a substantially uniform temperature being maintained automatically by the thermostat.

I claim:

1. The combination of a flat iron, a gas supplied burner for heating the iron, and means for automatically proportioning the flow of gas to the temperature of the smoothing surface of the iron whereby such temperature may be maintained substantially uniform regardless of varying heat consuming demands upon the smoothing surface.

2. The combination of a flat iron, a burner for heating the iron, and means for automatically proportioning the supply of fuel to the temperature of the smoothing surface of the iron whereby such temperature may be maintained substantially uniform regardless of varying heat consuming demands upon the smoothing surface.

3. The combination of a flat iron, a burner for heating the iron, a valve for controlling the supply of fuel to the burner, and thermostatic means operatively connected to the valve and actuated by variations of temperature of the smoothing surface of the iron for proportioning the flow of fuel to varying heat consuming demands upon said surface.

4. The combination of a flat iron body having the portion thereof adjacent its smoothing surface constituting an element of a thermostat, a gas supplied burner for heating the smoothing surface, a valve for controlling the flow of gas to the burner, and another thermostatic element coöperating with the first mentioned thermostatic element and operatively connected to the valve for proportioning the flow of gas to the heat consuming demands upon the smoothing surface.

5. The combination of a flat iron having a smoothing surface, a gas supplied burner for heating said surface, a valve for controlling the flow of gas to the burner, and thermostatic means operatively connected to the valve and actuated by variations of temperature of the smoothing surface for proportioning the flow of gas to the heat consuming demands upon said surface.

6. The combination of a flat iron having a smoothing surface, a gas supplied burner for heating said surface, a valve for controlling the flow of gas to the burner, a spring for moving the valve in one direction, and thermostatic means operatively connected to the valve for moving it in opposition to said spring, the thermostatic means actuated by variations of temperature of the smoothing surface of the iron for proportioning the flow of gas to the heat consuming demands upon said surface.

7. The combination of a flat iron, a gas supplied burner for heating the same, a valve casing through which gas passes to the burner, a valve movable in the casing for controlling the flow of gas, a lever at the exterior of the casing and operatively connected to the valve, a spring for moving the lever in one direction, a thermostatic device actuated by variations of temperature of the smoothing surface of the iron, and an operative connection between the thermostatic device and lever for moving the latter in opposition to the spring.

8. The combination of a flat iron, a gas supplied burner for heating the same, means for controlling the flow of gas, thermostatic means extending from end to end of the iron and exposed to variations in temperature throughout the length of the smoothing face thereof, and an operative connection between the thermostatic means and said controlling means.

9. In a flat iron, the combination of a hollow body, a gas supplied burner within the body for heating the same, a valve for controlling the flow of gas, thermostatic means below the burner and above the smoothing face of the iron and actuated by temperature variations of the latter, and an operative connection between the thermostatic means and said valve.

10. The combination of a flat iron formed with a cavity adjacent its smoothing face, a gas supplied burner for heating the iron, a valve for controlling the flow of gas, and a thermostatic device within said cavity and operatively connected to the valve.

11. The combination of a flat iron formed with a cavity extending from end to end thereof adjacent its smoothing face, a gas supplied burner for heating the iron, a valve for controlling the flow of gas, and a thermostatic rod within said cavity and operatively connected to the valve.

12. The combination of a flat iron formed with a cavity adjacent its smoothing face and open through a wall of the iron, a gas supplied burner for heating the iron, a valve for the burner, a thermostatic device within said cavity, and an operative connection between the thermostatic device and said valve.

13. In a flat iron, the combination of a hollow body, the metal constituting the bottom portion of the body formed with a cavity, a gas supplied burner within the body, a valve for controlling the flow of gas, and a thermostatic device located in said cavity and operatively connected to the valve.

14. In a flat iron, the combination of a hollow body, the metal constituting the bottom portion of the body formed with a cavity extending from end to end of the iron, a thermostatic rod located in said cavity, a gas supplied burner within the hollow body, a valve for controlling the flow of gas, and an operative connection between the thermostatic rod and valve.

15. The combination of a flat iron, a gas supplied burner for heating the same, a valve for controlling the flow of gas, a thermostatic device exposed to variations in temperature of the smoothing surface of the iron, and a motion transmitting lever operatively connecting said device and valve.

16. In a flat iron, the combination of a hollow body, a gas supplied burner within the body, a tubular device at the exterior of the body and in communication with the burner, a valve within the tubular device for controlling the supply of gas, a thermostatic device actuated by variations in temperature of the smoothing surface of the iron, and means operatively connecting the thermostatic device and said valve.

17. In a flat iron, the combination of a hollow body, a gas supplied burner within the body, a tubular device at the exterior of the iron and in communication with the burner, a valve within the tubular device for controlling the supply of gas, a thermostatic device actuated by variations of temperature in the smoothing surface of the iron, and a lever mounted on the tubular device and operatively connecting the thermostatic device and said valve.

18. The combination of a flat iron, a gas burner therefor, a thermostatic device carried by the iron and actuated by variations in temperature of the smoothing face thereof, a valve for the burner, and an adjustable connection between the valve and thermostat.

19. The combination of a flat iron, a gas burner therefor, a thermostatic device carried by the iron and actuated by variations in temperature of the smoothing face thereof, a valve for the burner, an operative connection between the thermostat and valve for closing the latter, and a spring for opening the valve and for opposing its closing movement.

In testimony whereof I affix my signature in presence of two witnesses.

EDWIN RUUD.

Witnesses:
J. W. NESBIT,
ELLA McCONNELL.